United States Patent [19]

Skaggs, Jr.

[11] 4,386,540

[45] Jun. 7, 1983

[54] HYPOCYCLIC DRIVE TRANSMISSION APPARATUS

[75] Inventor: Riley E. Skaggs, Jr., Dodge City, Kans.

[73] Assignee: Curtis Machine Company, Dodge City, Kans.

[21] Appl. No.: 914,173

[22] Filed: Jun. 9, 1978

Related U.S. Application Data

[63] Continuation-in-part of Ser. No. 793,613, May 4, 1977, abandoned.

[51] Int. Cl.³ ............................................. F16H 1/28
[52] U.S. Cl. ................................................... 74/805
[58] Field of Search ........................................ 74/805

[56] References Cited

U.S. PATENT DOCUMENTS

| | | |
|---|---|---|
| 65,811 | 6/1867 | Holmes . |
| 341,389 | 5/1886 | Prescott . |
| 386,168 | 7/1888 | Spencer et al. . |
| 399,285 | 3/1889 | Rose . |
| 511,169 | 12/1893 | Snider . |
| 516,054 | 3/1894 | Ives . |
| 595,694 | 12/1897 | Cary . |
| 611,329 | 9/1898 | Lindsay . |
| 617,392 | 1/1899 | Bowers . |
| 621,740 | 3/1899 | Bew . |
| 1,107,108 | 8/1914 | Poniatowski . |
| 1,193,419 | 8/1916 | Pierce . |
| 1,347,730 | 7/1920 | Zeitlin . |
| 1,599,633 | 9/1926 | Bemis . |
| 1,836,602 | 12/1931 | King . |
| 1,929,196 | 10/1933 | Waddell . |
| 1,953,199 | 4/1934 | Snyder . |
| 1,999,267 | 4/1935 | Willgoos . |
| 2,011,855 | 8/1935 | Gilman . |
| 2,098,894 | 11/1937 | Van Doorne et al. . |
| 2,240,998 | 5/1941 | Montiglio . |
| 2,250,259 | 7/1941 | Foote, Jr. .............................. 74/805 |
| 2,303,045 | 11/1942 | Grayson . |
| 2,354,386 | 7/1944 | Lawler .................................. 74/805 |
| 2,360,137 | 10/1944 | Jennings . |
| 2,540,973 | 2/1951 | Wallace . |
| 2,657,586 | 11/1953 | Chestley . |
| 2,753,731 | 7/1956 | McWethy . |
| 3,144,791 | 8/1964 | Menge, Sr. ........................... 74/805 |
| 3,180,170 | 4/1965 | Lee . |
| 3,251,630 | 5/1966 | Astley . |
| 3,370,668 | 2/1968 | Goodacre . |
| 3,424,036 | 1/1969 | Colgan . |
| 3,831,692 | 8/1974 | Fry . |
| 3,944,007 | 3/1976 | Thom . |
| 3,955,445 | 5/1976 | Osterwalder ......................... 74/805 |
| 3,965,774 | 6/1976 | Omi et al. ............................ 74/805 |
| 3,979,167 | 9/1976 | Grove . |
| 4,014,224 | 3/1977 | Pitts ..................................... 74/805 |
| 4,016,780 | 4/1977 | Baranyi ................................ 74/805 |

FOREIGN PATENT DOCUMENTS

| | | | |
|---|---|---|---|
| 771841 | 10/1934 | France ................................. 74/805 |
| 587951 | 1/1959 | Italy ..................................... 74/805 |

OTHER PUBLICATIONS

Sumitomo Machinery Corp. of America, RA 21503.
Compudrive Corp. "Orbidrive".
Businessweek 1975, Aug. 11, 1975.
Gear Handbook, "Gear Arrangements", pp. 3-34 and 3-35.
Durst, "Here's the Feature They Can't Imitate".
T-L Irrigation Co., "Pivot Sprinkler".
Lindsay Company, "Heavy Duty Gear Boxes".

Primary Examiner—Leslie A. Braun
Attorney, Agent, or Firm—Robert M. Ward

[57] ABSTRACT

An improved hypocyclic drive transmission which is utilized especially in applications where high gear reductions and high torque output are required, and without limitation may be utilized in connection with specific applications such as self-propelled, wheel-driven apparatus, including irrigation systems, mowers, and heavy, earth moving equipment and/or fertilizer units, which devices may be powered by any power source, including for example a hydrostatic or electric drive.

3 Claims, 5 Drawing Figures

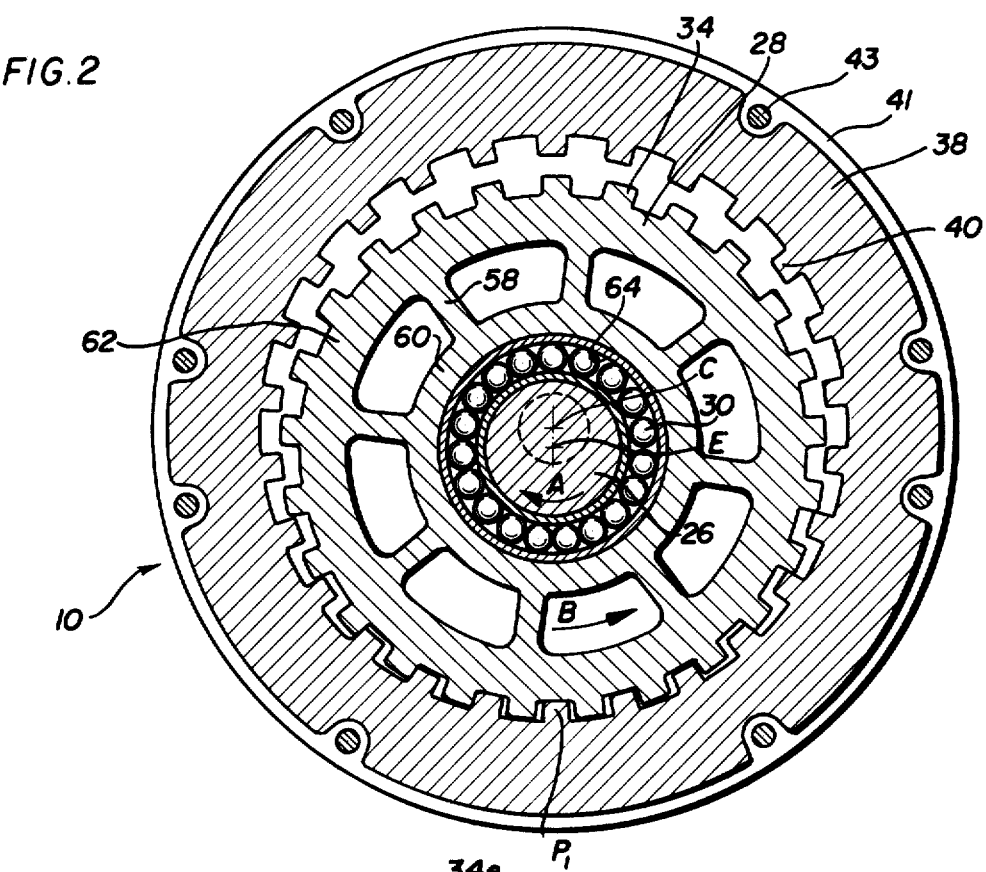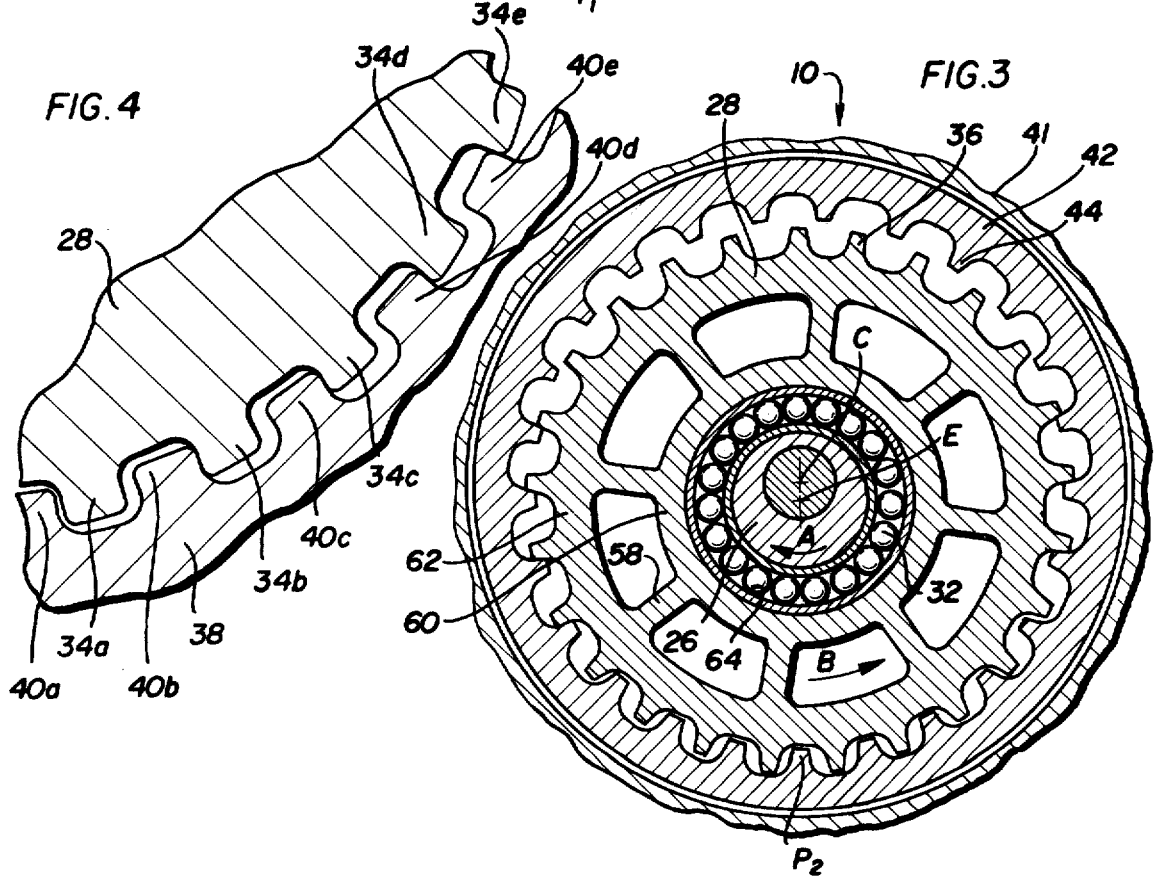

4,386,540

HYPOCYCLIC DRIVE TRANSMISSION APPARATUS

BACKGROUND OF THE INVENTION

This application for patent is a continuation-in-part application of copending U.S. patent application, Ser. No. 793,613, filed on May 4, 1977, now abandoned, by the same inventor hereof, and is assigned to a common assignee.

The present invention relates generally to transmission apparatus and more specifically an improved hypocyclic transmission which has found particular utility in conjunction with self-propelled, wheel-driven apparatus, such as irrigation systems, mowers, and earth moving equipment, as well as on any application where strength and stability are required while reducing the rotational speed of the output of a power source and simultaneously increasing the torque thereof.

Frequently, it has been found to be desirable or necessary to rotate a drive wheel member, especially in such applications as self-propelled circular irrigation systems, mowers and earth moving equipment, at a relatively low speed and at high torque, but with a minimum loss of power such as might be caused by the inefficiency of the transmission. For example, the drive wheels on a circular irrigation system optimally require a speed of approximately ½ a revolution per minute and a torque of 50,000 inch pounds, at high efficiency preferably on the order of approximately 80–90 percent. As conventional power sources will not operate at such a low speed and high torque, speed reduction gearing must be used.

Means of speed reduction gearing in the prior art includes the worm gear speed reducer and the planetary gear reducer. However, neither of these prior art speed reducers meets the optimal requirements for such self-propelled wheel driven units. Specifically, the worm gear reducer is very inefficient at low speeds resulting in wasted energy and increased overhead costs to the user(and hence members of the consuming public), which features are undesirable as further being detrimental to the environment and tending to increase dependency on foreign energy sources. Moreover, the prior art planetary drive units are expensve to produce because of the large number of gears required and the more complicated support systems necessary therefor. Additionally, prior art devices have most usually required machined gearing, which is expensive to produce.

One attempt to solve the aforementioned problems in the prior art is disclosed in U.S. Pat. No. 3,381,692 to Fry, wherein the drive unit in a self-propelled, wheel-driven circular irrigation system is powered by an electric motor. That power source drives a power shaft to reciprocate two pawls through alternating power strokes by means of two eccentrics each mounted on the shaft and rotates within one of the pawls for aternative drive against teeth of a drive gear. That device is lacking, however, in optimal strength and has proved to be less than optimally efficient in actual use.

Accordingly, in view of the limitations and disadvantages of the prior art, it is an object of the present invention to provide an improved speed reducing drive of uncomplicated, reliable, and compact construction which is highly efficient and relatively inexpensive and by which an output may be driven at relatively low speeds and high torque from any applicable power source.

It is also an object of the improved speed reducing drive of the present invention to provide eccentric driven circular gear means for engaging the external teeth thereof with internal teeth of a fixed annulus gear to trace thereby a hypocycloid therein, the rotational component of which may be reversed in direction and reduced in speed relative to the input rotation, said speed reducing drive powering, for example, an output hub of wheels for self-propelled circular irrigation systems, mowers and earth moving and/or fertilizer units.

It is another object of the improved hypocyclic transmission apparatus of the present invention to provide a circular gear having first and second sets of external gear teeth, one set of external gear teeth engaging a fixedly disposed annulus gear, and the second set of external gear teeth emgaging and driving a rotatable drive hub which is connected to an output shaft for driving same.

It is a further object of the improved hypocyclic transmission apparatus of the present invention to provide a point of maximum overlap between the first set of external gear teeth of the circular gear and the internal gear teeth of the annulus gear, wherein the first set of external gear teeth of the circular gear and the internal gear teeth of the annulus gear are in disengaged disposition at such point of maximum overlap, but are in engaged disposition at a radial distance greater than 0° but less than 90° from the point of maximum overlap.

It is a yet further object in certain embodiments of the improved hypocyclic transmission apparatus of the present invention to provide the greatest length of engagement between such gear teeth nearest the point of maximum overlap and decreasing for the gear teeth disposed at increasing radial distance from the point of maximum overlap, whereby the respective gear teeth first come under load at the maximum engagement and tip loading is thereby prevented, whereby frictional loss and tip damage are decreased.

It is also an object of the improved hypocyclic transmission apparatus of the present invention to provide disengaged dispostion between a second set of external gear teeth of the circular gear and internal teeth of the drive hub at the point of maximum overlap and engaged disposition at a radial distance greater than 0° but less than 90°.

It is yet another object of the improved hypocyclic transmission apparatus of the present invention to provide the maximum length of engagement between the teeth of the second set of gear teeth of the circular gear and the internal teeth of the drive hub, such length of engagement being greatest near the point of maximum overlap between the circular gear and the drive hub, and the length of the engagement for gear teeth disposed at increasing radial distances from the point of maximum overlap diminishing, whereby the respective gear teeth first comes under load at maximum engagement.

It is an additional object of the improved hypocyclic transmission apparatus of the present invention to provide gears of such configuration that they may be made of a non-machined material.

It is yet further an object of the improved hypocyclic transmission apparatus of the present invention to provide drive means which may be disposed between two output wheels for simultaneously driving a pair of hypocyclic speed reduction means whereby both such wheels are driven.

SUMMARY OF THE PRESENT INVENTION

The improved hypocyclic transmission apparatus of the present invention for reducing the rotational speed of the output of a motor and for increasing the torque thereof includes a transmission spindle shaft rotating in a first radial direction. A circular gear having two sets of external gear teeth is operatively connected to the transmission spindle shaft for rotational movement thereby. Such sets of external gear teeth on the circular gear may be equal in number or different in number. An annulus gear is fixedly disposed, such as for example by the surrounding transmission housing, and has internal gear teeth which are engageable with the first set of external gear teeth of the circular gear upon overlap therebetween. An eccentric means is fixedly mounted on the transmission spindle shaft and freely mounts the circular gear thereon for maintaining the circular gear and the annulus gear in overlapping relationship, thus engaging the respective gear teeth thereof. By means thereof, the circular gear traces a hypocycloid at reduced rotational speed within the annular gear in a second radial direction, which second direction is opposite to the first radial direction of the transmission spindle shaft. A rotatable drive hub having internally disposed teeth is disposed to surround a portion of the circular gear and to receive the reduced rotational speed thereof by means of the overlap between the circular gear and the drive hub. Rotational output means, such as an output shaft, is connected to the drive hub for receiving and transmitting the reduced rotational speed output. The various gears may preferably be made of a non-machined material, such as forged, cast, molded or extruded metal, plastic or other relatively rigid and durable material.

The particular motor means used is preferably a hydrostatic or electric motor although any suitable power source may be used. The improved hypocyclic transmission apparatus of the present invention may especially be used in combination with self-propelled irrigation systems, mower, earth moving, and/or fertilizer apparatus. The improved hypocyclic transmission of the present invention has broad application in any area where improved strength and stability are required while the rotational speed of the output of the motor is reduced during simultaneous increase in the torque thereof.

Various modifications of the improved hypocyclic transmission apparatus of the present invention are intended to be embodied and will become apparent to those skilled in the art from the teaching of the principles of the invention in connection with the disclosure of the specification, the claims and the drawing.

BRIEF DESCRIPTION OF THE DRAWING

FIG. 2 is a transverse, cross-sectional view of the improved transmission apparatus of the present invention taken along line 2—2 of FIG. 1, showing the overlap between the first set of external gear teeth of the circular gear and the internal gear teeth of the fixedly disposed annulus gear to define a point of maximum overlap therebetween, showing gear disengagement at the point of maximum overlap and gear engagement at a radial distance of greater than 0° but less than 90° from the point of maximum overlap and further showing the eccentric means mounting for free rotation thereabout as measured in the radial direction opposite to that of the input transmission spindle shaft, the circular gear by means of bearings;

FIG. 3 is a transverse, cross-sectional view of the embodiment of FIG. 2 of the improved transmission apparatus of the present invention taken along line 3—3 of FIG. 1, showing the portion of the circular gear having a second set of external gear teeth, the rotatable drive hub and the internal gear teeth thereof, and the overlap therebetween defining as in FIG. 2 a point of maximum overlap therebetween, showing gear disengagement at such point of maximum overlap and gear engagement at a radial distance of greater than 0° but less than 90° from the point of maximum overlap as measured in the same direction of rotation as that of the input transmission spindle shaft;

FIG. 4 is an enlarged view of a portion of FIG. 2, showing the details of the engagement between the first set of gear teeth of the circular gear and the internal gear teeth of the fixedly disposed annulus gear, wherein the length of the engagement therebetween is greatest nearest the point of maximum overlap between the circular and annulus gears and the length of such engagement diminishes for gear teeth disposed at an increasing radial distance from such point of maximum overlap;

DETAILED DESCRIPTION OF PREFERRED EMBODIMENTS

Figure 1:
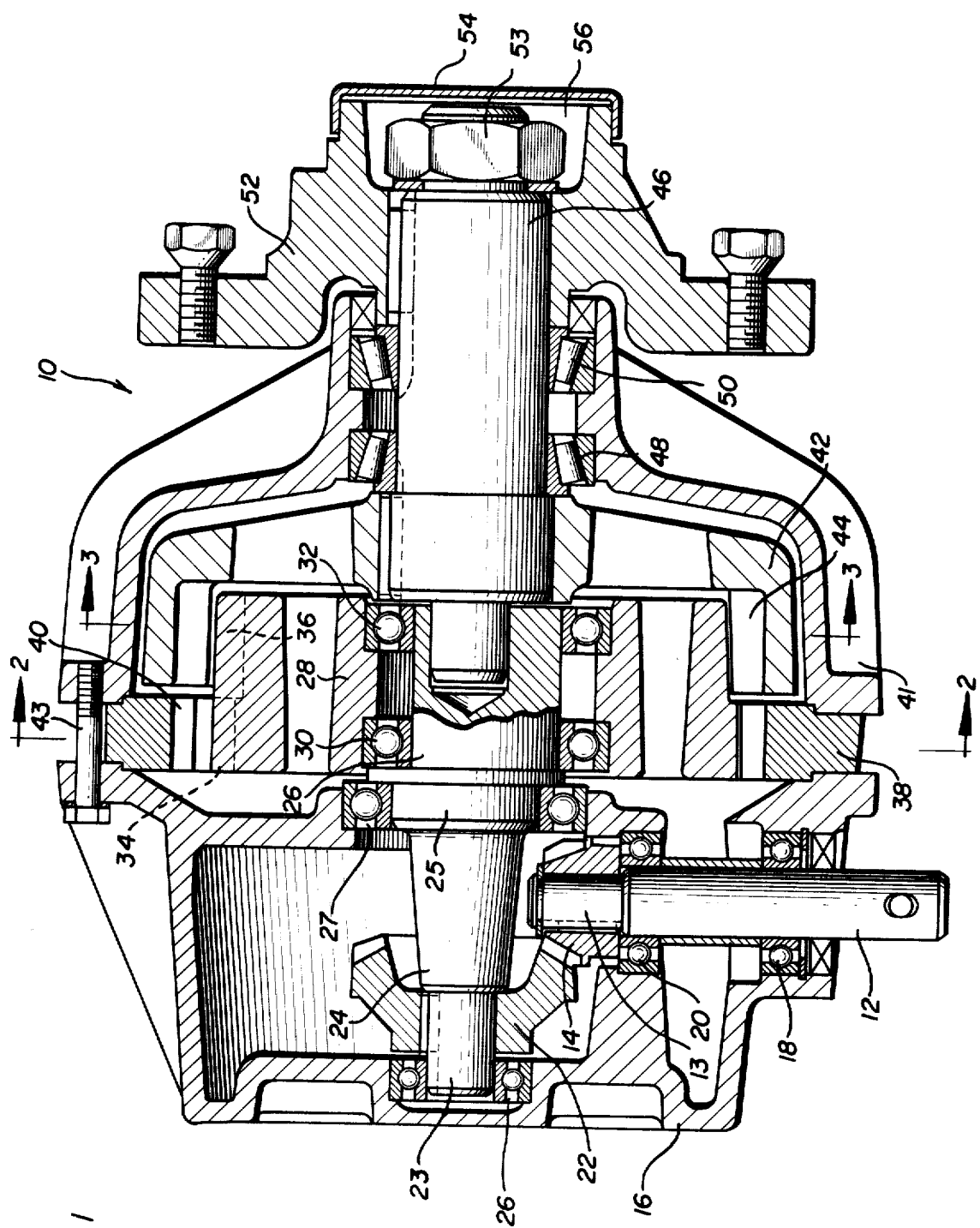
FIG. 1 is a longitudinal, cross-sectional view through the improved transmission apparatus of the present invention showing a motor linking shaft including an associated bevel gear rotationally connecting it to the transmission spindle shaft, the circular gear having first and second sets of external gear teeth, the fixed annulus gear having internal gear teeth and disposed for overlap with the circular gear, eccentric means mounted on the transmission spindle shaft and freely mounting the circular gear thereon, a rotatable drive hub having internal gear teeth disposed to surround the portion of the circular gear having the second set of external gear teeth, a rotational output shaft connected to the drive hub, and an output wheel connected to the output shaft.

The improved transmission apparatus of the present invention functions to reduce the rotational speed of the output of the power source, such as for example an electric or hydraulic motor, and to increase the torque thereof. The improved transmission apparatus includes a transmission spindle shaft which rotates in a first radial direction. A circular gear having first and second sets of external gear teeth is operatively connected to the transmission spindle shaft for rotational movement thereby. A fixedly disposed annulus gear having internal gear teeth is engageable thereby with the first set of external gear teeth of the circular gear upon overlap therebetween. An eccentric means, such as a cam or crank arm, is fixedly mounted on the transmission spindle shaft and mounts the circular gear thereon through a central opening therein. The result is free rotation about the shaft by means of bearings to maintain the circular gear and the annulus gear in overlapping relationship, engagement of the respective gear teeth thereof, and tracing by such circular gear of a hypocycloid at reduced rotational speed within the annulus gear in a second radial direction, which is opposite to the first radial direction of rotation of the transmission spindle shaft. A rotatable drive hub has internally disposed gear teeth and is disposed to surround a portion of the circular gear for engaging the second set of external gear teeth of the circular gear upon overlap therebetween. A rotational output means, such as an output shaft, is connected to the drive hub for receiving the reduced rotational speed output at increased torque. The output from the rotational output means may be transmitted to means such as a connected wheel for accomplishing work.

In one preferred embodiment the number of internal gear teeth of the annulus gear is greater than the number of gear teeth of the first set of external gear teeth of the circular gear. The number of internal gear teeth of the drive hub may be the same as the number of gear teeth of the second set of external gear teeth of the circular gear. In a second preferred embodiment, the number of internal gear teeth of the second set of external gear teeth of the circular gear is less than the number of teeth of the drive hub. In such second preferred embodiment the difference in the number of gear teeth between the first set of external gear teeth and the annulus gear is the same as the difference in number of teeth between the drive hub and the second set of external gear teeth, although the number of gear teeth in the first set of external gear teeth and the drive hub need not be the same.

In embodiments of the improved transmission apparatus of the present invention where the first and second sets of external gear teeth are the same in number, each gear tooth of the first set of external gear teeth of the circular gear corresponds to a gear tooth of the second set of external gear teeth of the circular gear, and such corresponding gear teeth are disposed in a common plane, which plane is longitudinal to the axis of rotation of the circular gear.

Each of the first and second sets of external gear teeth of the circular gear is circumferentially disposed on the circular gear in separate transverse planes disposed in spaced relationship normally the axis of rotation of the circular gear.

Motor linking means for drivingly connecting the motor and the transmission spindle shaft are further preferably provided. Such motor linking means may be disposed perpendicularly of the transmission spindle shaft, or alternatively may be disposed in line therewith. In embodiments where the motor linking means is disposed perpendicularly of the transmission spindle shaft, the motor linking means preferably comprises a motor output shaft mounting a beveled gear for rotation thereby, with the beveled gear engaging a mating beveled gear on the transmission spindle shaft, whereby the rotational drive from the motor is transmitted for driving the transmission spindle shaft having an axis of rotation perpendicular to the axis of rotation of the motor output shaft. In such case, the motor output shaft is journaled for rotation within bearings on at least one longitudinal side of the beveled gear mounted thereon. Alternatively, the power source may be directly coupled to the transmission spindle shaft.

It is further contemplated as being within the scope of the present invention to include a housing for the improved transmission apparatus, which housing may be sealed, and which may be substantially filled with a lubricant material. Such housing may further include a diaphragm communicating with the interior of the housing for controlling the pressure and volume thereof.

The improved transmission apparatus of the present invention yet further contemplates such overlap between the first set of external gear teeth of the circular gear and the internal gear teeth of the fixedly disposed annulus gear as to define thereby a point of maximum overlap therebetween. At such point of maximum overlap, the first set of external gear teeth of the circular gear and the internal gear teeth of the annulus gear are in disengaged disposition, and are in engaged disposition at a radial distance of greater than 0° but less than 90°, as measured in the second radial direction in one preferred embodiment, and as measured in the first radial direction in an alternative preferred embodiment. In one such preferred embodiment, the length of such engagement between the teeth of the first set of gear teeth of the circular gear and those of the annulus gear is greatest nearest the point of maximum overlap between the circular and annulus gears, and the length of such engagement diminishes for gear teeth disposed at increasing radial distance from the point of maximum overlap, whereby the respective gear teeth first come under load while at maximum engagement.

In the alternative preferred embodiment, wherein the number of gear teeth in the first and second sets of external gear teeth of the circular gear is not the same, the external gear teeth of the circular gear first come under load while at minimal engagement and such engagement occurs at a radial distance of greater than 0° but less than 90° as measured in the first radial direction.

The improved transmission apparatus of the present invention also yet further contemplates such overlap between the second set of external gear teeth of the circular gear and the internal gear teeth of the rotational output hub as to define thereby a point of maximum overlap therebetween. At such point of maximum overlap, the second set of external gear teeth of the circular gear and the internal gear teeth of the rotational output hub are in disengaged disposition, and are in engaged disposition at a radial distance of greater than 0° but less than 90°, as measured in the first radial direction in the first preferred embodiment, but as measured in the second radial direction in the alternative preferred embodiment wherein the number of gear teeth in the first and second sets of external gear teeth of the circular gear are not the same.

The length of such engagement between the teeth of the second set of gear teeth of the circular gear and those of the rotational output hub is greatest nearest the point of maximum overlap between the circular gear and the rotational output hub, and the length of such engagement diminishes for gear teeth disposed at increasing radial distance from the point of maximum overlap in the embodiments where the number of gear teeth in the first and second sets of external gear teeth are equal in number, and the opposite for alternative preferred embodiments where such number of gear teeth is not the same.

Referring now to the drawing and to FIG. 1 in particular, the improved transmission apparatus of the present invention, generally designated at 10, includes a motor output shaft 12 having mounted at the distal end 13 thereof a beveled gear 14. Output shaft 12 is mounted in a first housing portion 16 and journaled for rotation by means of bearings 18 and 20. Motor shaft beveled gear 14 matingly engages transmission spindle shaft beveled gear 22, which is fixedly mounted on the transmission spindle shaft 24. Transmission spindle shaft 24 is mounted on housing 16 and journaled for rotation therein by means of bearings 27, 27a. As set forth in FIG. 1, motor output shaft 12 may be disposed perpendicularly to transmission spindle shaft 24. In other embodiments, motor output shaft 12 may be disposed in-line disposition with transmission spindle shaft 24.

The distal end 25 of transmission spindle shaft 24 has an eccentric 26 fixedly mounted thereon for eccentric rotation thereby. Eccentric 26 is rotationally mounted in a circular gear 28 by means of bearings 30,32.

Circular gear 28 is operatively connected to transmit the rotational motion of transmission spindle shaft 24 through and by means of eccentric 26. Circular gear 28 has first and second sets of external gear teeth 34, 36. An annulus gear 38 having internal gear teeth 40 is fixedly mounted with respect to circular gear 28 by fixed attachment between first housing portion 16 and second housing portion 41, which portions are secured by housing connecting bolts 43. Eccentric 26 is fixedly mounted on transmission spindle shaft 24 and freely mounted thereon for rotation thereabout is circular gear 28 for maintaining circular gear 28 and annulus gear 38 in overlapping relationship, for engaging their respective gear teeth, namely the first set of external gear teeth 34 of circular gear 28 and internal gear teeth 40 of fixedly disposed annulus gear 38, for rotation of circular gear 28 under the influence of annulus gear 38 in a second radial direction which is opposite to the first radial direction of the transmission spindle shaft 24.

A rotatable drive hub 42 having internally disposed gear teeth 44 is disposed to surround a distal portion of circular gear 28, with internal gear teeth 44 of drive hub 42 engaging the second set of external gear teeth 36 of circular gear 28 to provide overlap between circular gear 28 and drive hub 42. Connected to drive hub 42 is rotational output shaft 46 which is journaled for rotation by bearings 48, 50 within second housing portion 41. An output wheel 52 is fixedly attached to output shaft 46 by means of a wheel hub bolt 53.

The housing is preferably sealed and may be filled with a lubricant. A diaphragm 54 is sealingly disposed on housing 41 adjacent to wheel hub bolt 53 to form a sealed chamber 56 for controlling the pressure and volume of the interior of the housing.

Referring now to FIG. 2, housing 41 for the improved transmission apparatus 10 of the present invention is shown with housing connecting bolts 43 for holding together the two portions 16, 41 of the housing, as described hereinabove. Housing connecting bolts 43 likewise serve to fixedly dispose annulus gear 38 with respect to the housing. Annulus gear 38 includes a designated number of internal gear teeth 40, the embodiment shown in FIG. 2 having twenty-six (26) such internal gear teeth 40. Disposed inside annulus gear 38 is circular gear 28, FIG. 2 showing the portion of circular gear 28 containing the first set 34 of external gear teeth. The embodiment depicted in FIG. 2 has twenty-five (25) such external gear teeth in the first set 34 thereof. Lightness in weight of circular gear 28 may be enhanced by webbed construction, which includes a plurality of radially disposed spokes 58 connecting an inner portion 60 with an outer portion 62 thereof. Circular gear 28 includes a central aperture 64 therein, which contains eccentric 26 freely mounted for rotation of circular gear 28 thereabout by means of bearings 30. Shown in dotted lines are the proximal 23 and distal 25 portions of transmission spindle shaft 24 to emphasize that eccentric 26 is disposed off-center with respect to fixedly disposed annulus gear 38. Thus, as transmission spindle shaft 24 rotates in the first radial direction (see Arrow A), eccentric 26 is rotated in a path eccentric to annulus center point C, thereby to cause the first set 34 of external gear teeth of circular gear 28 to overlap internal gear teeth 40 of annulus gear 38, to define thereby a point of maximum overlap $P_1$. As eccentric 26 rotates, with eccentric center point E revolving planetarily about annulus center point C the first set of external gear teeth 34 of circular gear 28 is forced into engagement with internal gear teeth 40 of fixedly disposed annulus gear 38. Inasmuch as eccentric 26 is mounted for free rotation by means of the circumferentially disposed bearings 30, the engagement between the respective gear teeth causes rotation of circular gear 28 in the opposite radial direction, as depicted by Arrow B. Thus, a hypocycloid is traced at reduced rotational speed within annulus gear 38 by circular gear 28.

Referring now to FIGS. 2 and 4, the respective gear teeth 34a, 40a are in disengaged disposition, at the point of maximum overlap $P_1$ between first set 34 of external gear teeth of circular gear 28 and internal gear teeth 40 of fixedly disposed annulus gear 38, but are in engaged disposition at a radial distance therefrom of greater than 0°, but less than 90° as measured in the second radial direction, as indicated by Arrow B. The length of the engagement between the first set 34 of gear teeth of circular gear 28 and internal gear teeth 40 of annulus gear 38 is greatest near the point of maximum overlap $P_1$ between circular and annulus gears 28, 38. In FIG. 4 teeth 34b, 40b have the longest such engagement, with the length of the engagement respectively diminishing for gear teeth 34c, 40c, 34d, 40d, and 34e, 40e, disposed at increasing radial distances from the point of maximum overlap $P_1$. The result is that the respective gear teeth of the first set of gear teeth of circular gear 28 and internal gear teeth 40 of annulus gear 38 first come under load while at maximum engagement, as shown in FIGS. 2 and 4, and tip loading is prevented, which decreases the frictional loss of improved transmission apparatus 10 and prevents tip damage.

Referring now to FIG. 3, rotatable drive hub 42 having internally disposed gear teeth 44 is disposed within housing second portion 41 of improved transmission apparatus 10. Internal gear teeth 44 of drive hub 42 engage the second set 36 of external gear teeth of circular gear 28 upon overlap between circular gear 28 and drive hub 42. The overlap therebetween is as is discussed hereinabove in regard to FIG. 2. The teeth of the second set 36 of external gear teeth of circular gear 28 are twenty-five (25) in number, which corresponds to the twenty-five (25) internal gear teeth 44 of rotatable drive hub 42. Thus, the produced reverse rotational speed described hereinabove in connection with the hypocyclic motion between circular gear 28 within the fixedly disposed annulus gear 38 is transmitted to rotatable drive hub 42, as shown in FIG. 3. As above in FIG. 2, the overlap between second set 36 of external gear teeth of circular gear 28 and internal teeth 44 of drive hub 42 defines a point of maximum overlap therebetween $P_2$, which is in the same longitudinal plane as the point of maximum overlap $P_1$ between first set 34 of external gear teeth of circular gear 28 and internal gear teeth 40 of fixedly disposed annulus gear 38. Second set 36 of external gear teeth of circular gear 28 and internal teeth 44 of drive hub 42 are in disengaged disposition at the point of maximum overlap $P_2$, and in engaged disposition at a radial distance of greater than 0° but less than 90° as measured in the first radial direction, as shown by Arrow A. The length of the engagement between second set 36 of gear teeth of circular gear 28 and internal gear teeth 44 of drive hub 42 is greatest nearest the point of maximum overlap $P_2$, and the length of the engagement diminishes for gear teeth disposed at increasing radial distance from the point of maximum overlap $P_2$. Thus, the respective gear teeth 36, 44 first come under load while at a maximum engagement and tip loading is prevented thereby to decrease frictional loss and tip damage.

Figure 5:
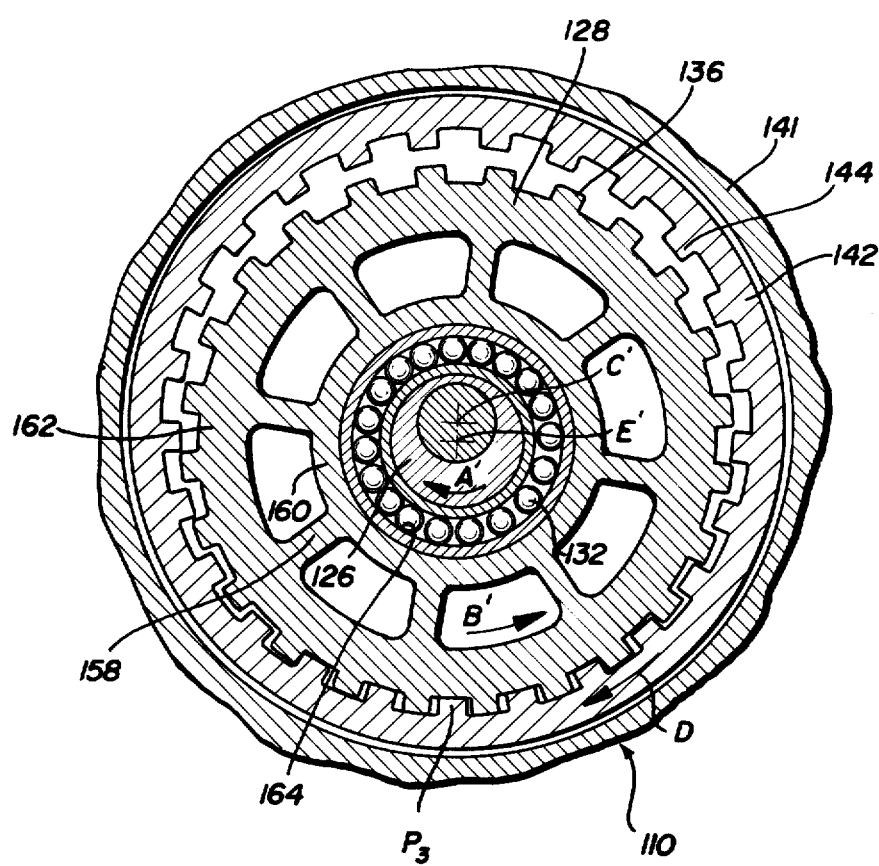
FIG. 5 is a transverse, cross-sectional view similar to that of FIG. 3 of an alternative preferred embodiment of the improved transmission apparatus of the present invention wherein there is gear engagement between an annulus gear having 26 gear teeth and the first set of external gear teeth of the circular gear having 25 gear teeth as shown in FIG. 2, and as shown herein engagement between the drive hub having 25 teeth and the second set of external gear teeth having 24 gear teeth, whereby a gear reduction of 625:1 is attained.

An alternative embodiment of the improved transmission apparatus of the present invention, as depicted in FIG. 5, is similar to the embodiment of FIGS. 2-4, except for the number of gear teeth present in the second set of external gear teeth of the circular gear. Also, the gear teeth of such second set of external gear teeth are preferably shaped similarly to those of the first set of external gear teeth. In the embodiment of FIG. 5 the difference between the number of gear teeth must be the same as the difference between the second set of gear teeth of the circular gear and those of the drive hub. In such embodiment as shown in FIG. 5, the annulus gear has 26 gear teeth and the first set of external gear teeth of the circular gear has 25 gear teeth; and the drive hub has 25 gear teeth with the second set of external gear teeth having 24 gear teeth.

The gear reductions obtained by the embodiments of FIGS. 2-4 and FIG. 5 are shown respectively in equations 1 and 2 as follows:

Equation 1

$$-R = \frac{Gc_1}{Gc_1 - Af}$$

Equation 2

$$R = \frac{Gc_1}{Gc_1 - Af} \times \frac{Hr}{Gc_2 - Hr}$$

where R is the gear ratio, $Gc_1$ and $Gc_2$ are the respective number of gear teeth in the circular gear 20 or 128, and Af and Hr are respectively the number of gear teeth in fixed annulus gear 38 and in rotatable drive hub 142.

Hence, applying the above equations, the embodiment of the improved transmission apparatus of the present invention as shown in FIGS. 2-4 attains a gear ratio reduction of −25 to be characterized as a "two-stage" gear reduction, and attains a gear ratio of +625 to 1.

The method of operation of the alternative preferred embodiment as shown in FIG. 5 is somewhat different from the embodiments depicted hereinabove. One difference is that the rotational output is in the same rotational direction as the rotational input, rather than in the reverse rotational direction as in the embodiment of FIGS. 2-4. Another difference is that in the embodiment of FIG. 5 the first set of external gear teeth of the circular gear are in engaged disposition with respect to the annulus gear at a radial distance of greater than 0° but less than 90° as measured in the first radial direction, rather than in the second radial direction, as shown in the embodiment of FIGS. 2-4. Also, the second set of external gear teeth is in engaged disposition with respect to the drive hub at a radial distance of greater than 0° but less than 90° from the point of maximum overlap as measured in the second radial direction. Furthermore, the length of such engagements in the alternative preferred embodiment of FIG. 5 are least nearest the point of maximum overlap between the circular gear teeth and respectively the annulus gear or drive hub, and the length of such engagement increases for gear teeth disposed at increasing radial distances from the point of maximum overlap.

Referring now to the drawing and to FIG. 5 in particular, rotatable drive hub 142 having internally disposed gear teeth 144 is disposed within housing portion 141 of improved transmission apparatus 110. Internal gear teeth 144 of drive hub 142 engage the second set 136 of external gear teeth of the circular gear 128 upon overlap between circular gear 128 and drive hub 142. The overlap therebetween is similar to that depicted in FIGS. 2-4. The number of gear teeth in the second set 136 of external gear teeth of the circular gear 128 is 24 in number, whereas the number of gear teeth 144 in rotatable drive hub 142 is 25 in number. Thus, applying the formula described hereinabove, the gear reduction ratio attained by the "second stage" of FIG. 5 is 25 to 1. Multiplied by the 25 to 1 gear reduction of the "first stage," the resulting gear reduction for the entire apparatus is 625 to 1.

As in the embodiment set forth hereinabove with respect to FIGS. 2-4, the overlap between the second set 136 of external gear teeth of circular gear 128 and internal teeth 144 of drive hub 142 defines a point of maximum overlap therebetween $P_3$. The second set 136 of external gear teeth of circular gear 128 and internal teeth 144 of drive hub 142 are in disengaged disposition at the point of maximum overlap $P_3$, and in engaged disposition at a radial distance of greater than 0° but less than 90° as measured in the second radial direction, as shown by arrow B'. Contrastingly, the point of engagement is on the opposite side of the point of maximum overlap $P_3$ from that of the embodiment depicted in FIGS. 2-4. The length of the engagement between the second set 136 of gear teeth of circular gear 128 and internal gear teeth 144 of drive hub 142 is least nearest the point of maximum overlap $P_3$, and the length of the engagement increases for gear teeth disposed at increasing radial distances from the point of maximum overlap $P_3$. Thus, the respective gear teeth 136, 144, first come under load while at a minimal engagement. Preferably, the point of such engagement is sufficiently far removed in distance from the tip of the gear to avoid tip loading and thus damage to such gear tips.

As in the embodiment of FIGS. 2-4 lightness in weight of circular gear 128 is preferably enhanced by a webbed construction, which includes a plurality of radially disposed spokes 158 connecting an inner portion 160 with an outer portion 162 thereof.

The various gears in the improved hypocyclic transmission apparatus of the present invention may be made of any material of sufficient strength and durability, and non-machined materials are preferred: examples are forged, cast, molded or extruded metal, plastic, or other relatively rigid and durable materials.

The basic and novel characteristics of the improved transmission apparatus of the present invention and the advantages thereof will be readily understood from the foregoing disclosure by those skilled in the art. It will become readily apparent that various changes and modifications may be made in the form, construction and arrangement of the combination apparatus set forth hereinabove without departing from the spirit and scope of the invention. Accordingly, the preferred and alternative embodiments of the present invention set forth hereinabove are not intended to limit such spirit and scope in any way.

What is claimed is:

1. An improved hypocyclic drive transmission apparatus for reducing the rotational speed of the output of a motor and increasing the torque thereof, said improved transmission apparatus comprising:
   a transmission spindle shaft rotating about a central axis in a first radial direction;
   a circular gear having first and second sets of lug-shaped, external gear teeth, and defining an interior diameter, a pitch diameter and an outside diameter, said circular gear operatively connected to said transmission spindle shaft for rotational movement thereby;
   a fixedly disposed annulus gear having lug-shaped internal gear teeth, the internal gear teeth of said annulus gear engageable with the first set of external gear teeth of said circular gear upon overlap between said circular gear and said annulus gear;
   eccentric means fixedly mounted on said transmission spindle shaft, said eccentric means having a center defining a cam offset distance from said spindle shaft central axis, and freely mounting said circular gear on said eccentric means for maintaining said circular gear and said annulus gear in overlapping relationship, for engaging the respective gear teeth thereof, and for tracing a hypocycloid at reduced rotational speed within said annulus gear by said circular gear in a second radial direction which is opposite the first radial direction of said transmission spindle shaft, said overlap defining a point of maximum overlap;
   a rotatable drive hub having internally disposed lug-shaped teeth and disposed to surround a portion of said circular gear, the internal teeth of said drive hub engaging the second set of external gear teeth of said circular gear upon overlap between said circular gear and said drive hub;
   rotational output means connected to said drive hub for receiving the reduced rotational speed output;
   the first set of external gear teeth of said circular gear and the internal gear of said annulus gear being disengaged at said point of maximum overlap, and in engagement at a radial distance of greater than 0 degrees but less than 90 degrees as measured in said angular direction from said point of maximum overlap, said circular gear teeth tracing a prolate cycloid at each of said circular gear interior, pitch and outside diameters immediately prior to, during and immediately after said engagement.

2. The improved hypocyclic drive transmission of claim 1 wherein the number of teeth in said first set of exterior teeth of said circular gear, and the number of internal teeth of said annulus gear, differ by one.

3. The improved hypocyclic drive transmission of claim 1 wherein said first set of teeth of said circular gear comprise drafted teeth thereby to reduce backlash in said engagement.

* * * * *